(12) United States Patent
Jung et al.

(10) Patent No.: US 8,045,083 B2
(45) Date of Patent: Oct. 25, 2011

(54) LIQUID CRYSTAL DISPLAY

(75) Inventors: Kwang-Chul Jung, Seongnam-si (KR);
Mee-Hye Jung, Suwon-si (KR);
Hee-Seop Kim, Hwaseong-si (KR);
Chong-Chul Chai, Seoul (KR);
Sung-Woon Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 470 days.

(21) Appl. No.: 12/335,133

(22) Filed: Dec. 15, 2008

(65) Prior Publication Data
US 2009/0256985 A1    Oct. 15, 2009

(30) Foreign Application Priority Data
Apr. 14, 2008   (KR) .................. 10-2008-0034285

(51) Int. Cl.
*G02F 1/136* (2006.01)
(52) U.S. Cl. .................................................. 349/48
(58) Field of Classification Search ............ 349/48
See application file for complete search history.

(56) References Cited

U.S. PATENT DOCUMENTS
7,683,979 B2 * 3/2010 Wang et al. ............... 349/46
* cited by examiner

*Primary Examiner* — Phu Vu
(74) *Attorney, Agent, or Firm* — F. Chau & Associates, LLC

(57) ABSTRACT

A liquid crystal display includes a substrate; a common voltage line formed on the substrate and transmitting a common voltage; a pixel electrode formed on the common voltage line and including a first subpixel electrode and a second subpixel electrode; a first thin film transistor connected to the first subpixel electrode, and including a first gate electrode, a first source electrode, and a first drain electrode; a second thin film transistor connected to the second subpixel electrode, and including a second gate electrode, a second source electrode, and a second drain electrode; a boosting capacitor connected to the first subpixel electrode; a third thin film transistor connected to the common voltage line and the boosting capacitor, and including a third gate electrode, a third source electrode, and a third drain electrode; and a fourth thin film transistor connected to the second subpixel electrode and the boosting capacitor, wherein the common voltage line is formed in the same layer as the third source electrode, and is electrically connected to the third source electrode.

20 Claims, 12 Drawing Sheets

LIQUID CRYSTAL DISPLAY

CROSS-REFERENCE TO RELATED APPLICATION

This application claims priority to and the benefit of Korean Patent Application No. 10-2008-0034285 filed in the Korean Intellectual Property Office on Apr. 14, 2008, the entire contents of which are incorporated herein by reference.

BACKGROUND OF THE INVENTION (a) Technical Field

The present disclosure relates to a liquid crystal display.

(b) Discussion of Related Art

Liquid crystal displays (LCDs) are one of the most widely used flat panel displays. Typically, an LCD includes a pair of panels provided with field-generating electrodes, such as pixel electrodes, and a common electrode, with a liquid crystal (LC) layer interposed between the two panels. The LCD displays images by applying voltages to the field-generating electrodes to generate an electric field in the LC layer that determines the orientations of LC molecules therein to adjust polarization of incident light.

Among such LCDs, there is a vertical alignment (VA) mode LCD, which aligns LC molecules such that their long axes are perpendicular to the panels in the absence of an electric field. The VA mode LCD is favored because of its high contrast ratio and wide reference viewing angle.

In the vertical alignment (VA) mode LCD, the wide reference viewing angle can be realized by forming a plurality of domains including the liquid crystal molecules that have different alignment directions in one pixel.

To form the plurality of domains in one pixel one method involves forming minute cutouts in the field generating electrodes, and another method involves forming protrusions on the field generating electrodes. In this way, the plurality of domains may be formed by aligning the liquid crystal molecules vertically with respect to a fringe field generated between the edges of the cutout or the protrusions and the field generating electrodes facing the edges.

As another approach for forming the plurality of domains in one pixel, there is a light alignment method in which the alignment direction of the liquid crystal molecules and the alignment angle are controlled by irradiating light on the alignment layer.

As a drawback, however, the liquid crystal display of the vertical alignment (VA) mode has lower side visibility compared with front visibility, and it is proposed that one pixel be divided into two subpixels and different voltages applied to the subpixels to solve this problem.

Among the various methods for achieving the above-mentioned solution, one data voltage is applied to two subpixels, and then the charged voltage of one subpixel is decreased and the charged voltage of the other subpixel is increased through a voltage boosting capacitor such that the visibility may be improved by differentiating the voltages of the two subpixels without reduction of the aperture ratio due to an increase of the number of data lines or gate lines. Also, there is no need to make the two subpixels capacitively coupled to each other, which may decrease the luminance.

The above information disclosed in this Background section is only for enhancement of understanding of the background of the invention and therefore it may contain information that does not form the prior art that is already known in this country to a person of ordinary skill in the art.

SUMMARY OF THE INVENTION

A liquid crystal display according to an exemplary embodiment of the present invention includes a substrate; a common voltage line formed on the substrate for transmitting a common voltage; a pixel electrode formed on the common voltage line and including a first subpixel electrode and a second subpixel electrode; a first thin film transistor connected to the first subpixel electrode and including a first gate electrode, a first source electrode, and a first drain electrode; a second thin film transistor connected to the second subpixel electrode and including a second gate electrode, a second source electrode, and a second drain electrode; a boosting capacitor connected to the first subpixel electrode; a third thin film transistor connected to the common voltage line and the boosting capacitor and including a third gate electrode, a third source electrode, and a third drain electrode; and a fourth thin film transistor connected to the second subpixel electrode and the boosting capacitor, wherein the common voltage line is formed in the same layer as the third source electrode, and is electrically connected to the third source electrode.

An exemplary embodiment of the liquid crystal display may further include a first gate line connected to the first thin film transistor, the second thin film transistor, and the third thin film transistor; a second gate line connected to the fourth thin film transistor; and a data line connected to the first and second thin film transistors, wherein the second gate line is applied with a gate-on voltage after the first gate line is applied with a gate-on voltage.

The common voltage line may be parallel to the data line and may overlap the pixel electrode.

The common voltage line may transverse to the pixel electrode so as to bisect it.

The liquid crystal display may further include an insulating layer formed between the common voltage line and the pixel electrode.

The pixel electrode and the common voltage line may be capacitively coupled to each other via the insulating layer interposed therebetween.

The insulating layer may include an inorganic layer made of an inorganic insulating material and an organic layer made of an organic insulating material and the organic layer may be removed in a region where the pixel electrode and the common voltage line are capacitively coupled to each other.

The organic layer made of the organic insulating material may include a color filter.

The third drain electrode and the fourth drain electrode may be connected to each other, and the first subpixel electrode and the fourth drain electrode may be capacitively coupled to each other via the insulating layer to form the boosting capacitor.

The insulating layer may include an inorganic layer made of an inorganic insulating material and an organic layer made of an organic insulating material, and the organic layer may be removed in a region where the pixel electrode and the common voltage line are capacitively coupled to each other.

The organic layer made of an organic insulating material may include a color filter.

The area of the second subpixel electrode may be one to three times the area of the first subpixel electrode.

The liquid crystal display may further include an upper substrate facing the substrate, and a common electrode formed on the upper substrate.

The first and second subpixel electrodes may include a first cutout, and the common electrode includes a second cutout.

The first and second subpixel electrodes may respectively include a transverse stem, a longitudinal stem crossing the transverse stem, and a plurality of minute branches extending from the transverse stem and the longitudinal stem. The first and second subpixel electrodes may respectively include a plurality of subregions in which the minute branches extend in different directions.

The common voltage line overlaps the longitudinal stems of the first and second subpixel electrodes.

DETAILED DESCRIPTION OF EXEMPLARY EMBODIMENTS

The present invention will be described more fully hereinafter with reference to the accompanying drawings, in which exemplary embodiments of the invention are shown. As those of ordinary skill in the art would realize, the described exemplary embodiments may be modified in various different ways, all without departing from the spirit or scope of the present invention.

Now, a liquid crystal display according to an exemplary embodiment of the present invention will be described with reference to FIG. 1 and FIG. 2.

Figure 1:
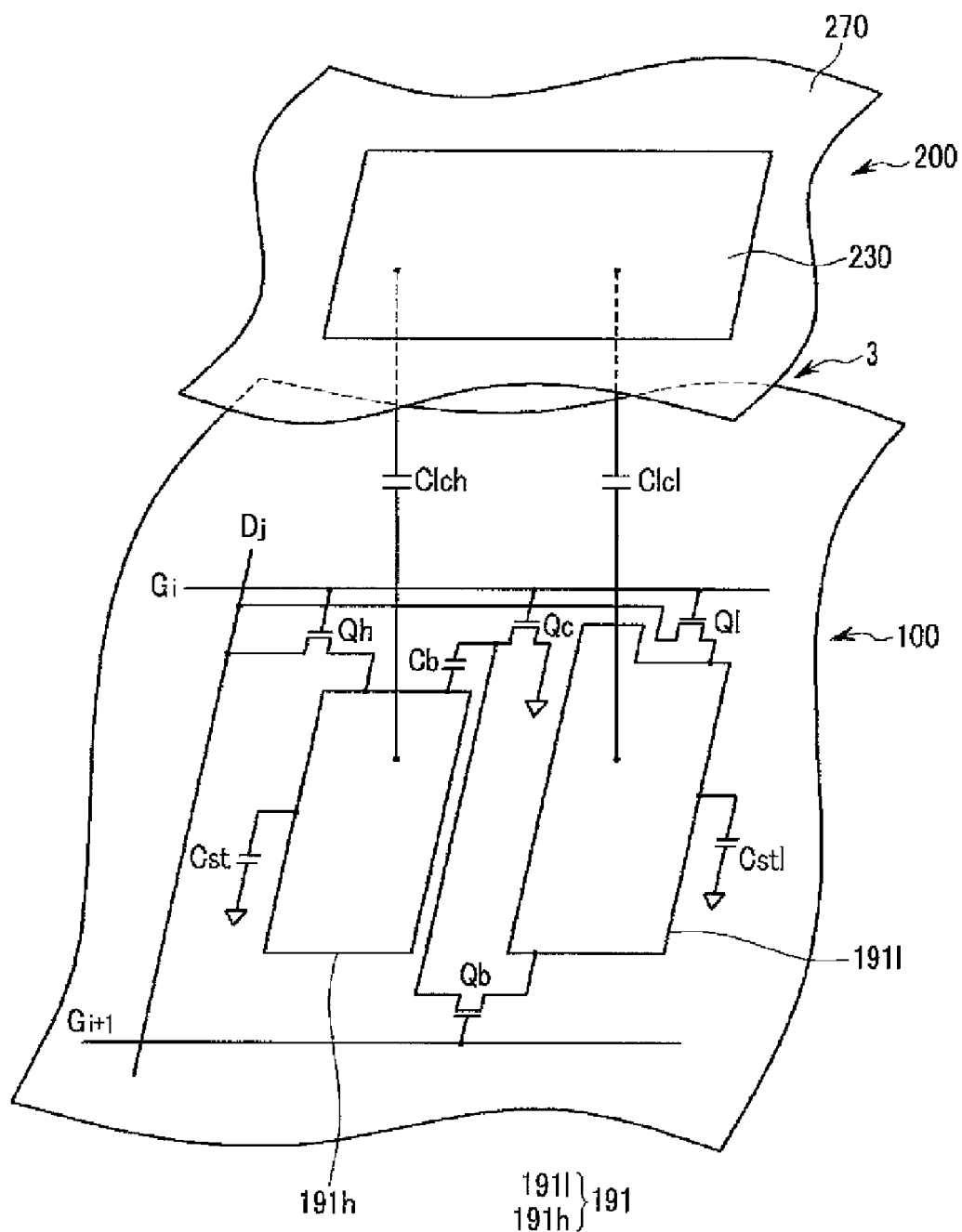
FIG. 1 is an equivalent circuit diagram of two subpixels in a liquid crystal display according to an exemplary embodiment of the present invention.
Figure 2:
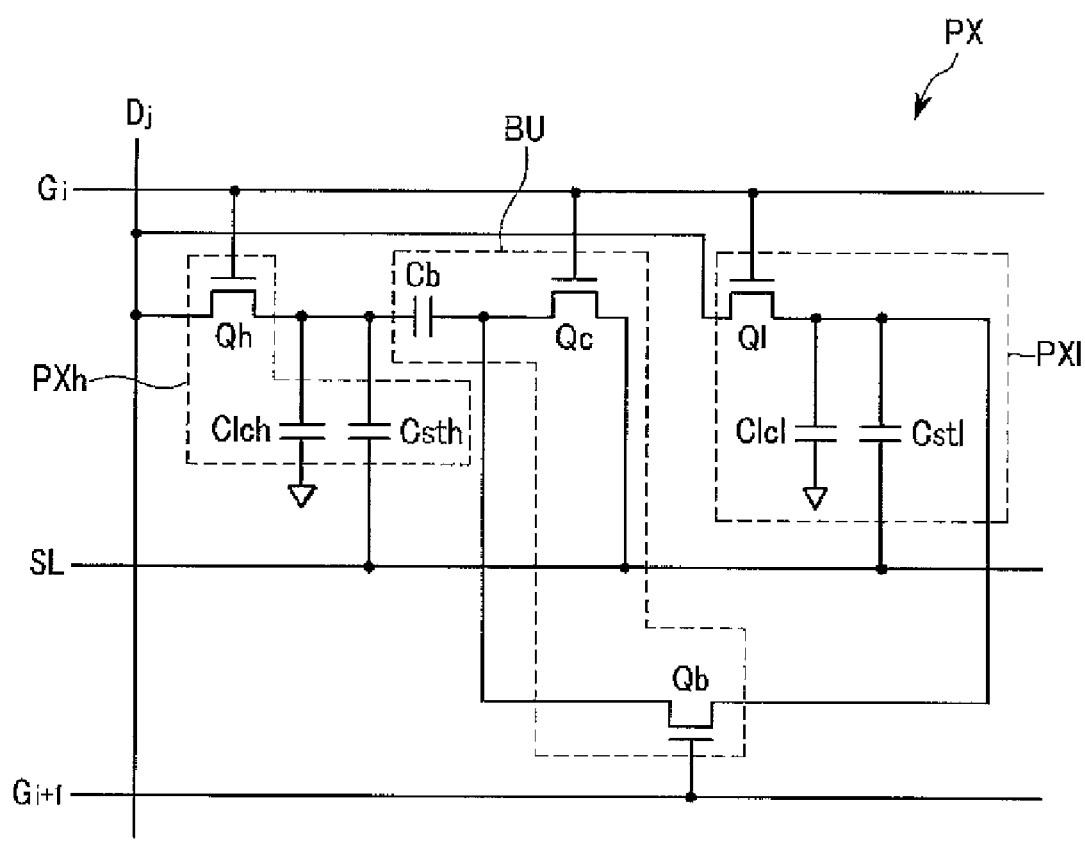
FIG. 2 is an equivalent circuit diagram of one pixel in a liquid crystal display according to an exemplary embodiment of the present invention.

FIG. 1 is an equivalent circuit diagram of two subpixels in a liquid crystal display according to an exemplary embodiment of the present invention, and FIG. 2 is an equivalent circuit diagram of one pixel in a liquid crystal display according to an exemplary embodiment of the present invention.

Referring to FIG. 1 and FIG. 2, a liquid crystal display according to an exemplary embodiment includes a plurality of signal lines including a plurality of gate lines $G_i$ and $G_{i+1}$ (i=1, 2, ..., n), a plurality of data lines $D_j$ (j=1, 2, ..., m) although only one is shown, and a plurality of common voltage lines SL although only one is shown, and a plurality of pixels PX connected thereto. One pixel PX is shown in FIG. 2. In point of view of a structure, the liquid crystal display includes a lower panel 100 and an upper panel 200 facing each other, and a liquid crystal layer 3 interposed therebetween, as shown in FIG. 1.

The signal lines $G_i$, $G_{i+1}$, $D_j$, and SL are all disposed on the lower panel 100. The gate lines $G_i$ and $G_{i+1}$ transmit gate signals, the data lines $D_j$ transmit data signals, and the common voltage line SL is applied with a predetermined voltage, such as a common voltage.

Referring to FIG. 2, each pixel PX includes first and second subpixels PXh and PXl, and a booster unit BU. The first/second subpixel PXh/PXl includes a first/second switching element Qh/Ql, a first/second liquid crystal capacitor Clch/Clcl, and a first/second storage capacitor Csth/Cstl, and the booster unit BU includes a third switching element Qc, a fourth switching element Qb, and a boosting capacitor Cb.

The first to fourth switching elements Qh, Ql, Qc, and Qb are three-terminal elements, such as thin film transistors, which are provided in the lower panel 100.

The control terminal of the first/second switching element Qh/Ql is connected to the gate line Gi the input terminal thereof is connected to the data line Dj, and the output terminal thereof is connected to the first/second liquid crystal capacitor Clch/Clcl and the first/second storage capacitor Csth/Cstl.

The control terminal of the third switching element Qc is connected to the gate line Gi, the input terminal thereof is connected to the common voltage line SL, and the output terminal thereof is connected to the fourth switching element Qb and the boosting capacitor Cb.

The control terminal of the fourth switching element Qb is connected to a next gate line Gi+1, the input terminal thereof is connected to the output terminal of the second switching element Ql, the second liquid crystal capacitor Clcl, and the second storage capacitor Cstl, and the output terminal thereof is connected to the output terminal of the third switching element Qc and the boosting capacitor Cb.

Referring to FIG. 1, the first/second liquid crystal capacitor Clch/Clcl includes the first/second subpixel electrode 191*h*/191*l* of the lower panel 100 and a common electrode 270 of the upper panel 200 forming the two terminals of the first/second liquid capacitor Clch/Clcl. The liquid crystal layer 3 between the two terminals serves as a dielectric material of the first/second liquid capacitor Clch/Clcl. The first and second subpixel electrodes 191*h* and 191*l* are separated from each other and combine to form one pixel electrode 191. The common electrode 270 is formed on the whole surface of the upper panel 200 and is applied with the common voltage. The liquid crystal layer 3 has a negative dielectric anisotropy, and the liquid crystal molecules of the liquid crystal layer 3 can be aligned such that their major axes be perpendicular to the surfaces of the two display panels when no electric field is applied. Unlike what is shown in FIG. 1, the common electrode 270 may be formed on the lower panel 100, and at least one of the two electrodes 191 and 270 may have a linear shape or a bar shape.

The first/second storage capacitor Csth/Cstl that serves as an auxiliary to the first/second liquid crystal capacitor Clch/Clcl is formed by the first/second subpixel electrode 191*h*/191*l* and the common voltage line SL overlapping each other with an insulator interposed therebetween. The first and second storage capacitors Csth and Cstl may also be formed, however, by making the first and second subpixel electrodes 191*h* and 191*l* overlap the previous gate line via the insulator (not shown).

The boosting capacitor Cb is formed by having the first subpixel electrode 191*h* of the lower panel 100 overlap the respective output terminals of the third switching element Qc and the fourth switching element Qb with the insulator (not shown) interposed therebetween.

Meanwhile, for color display, each pixel PX uniquely displays one of three primary colors (spatial division) or each pixel PX alternately displays the three primary colors (temporal division) over time, and a desired color is displayed by a spatial or temporal sum of the primary colors. For example, the primary colors are the three primary colors red, green, and blue. As an example of spatial division, FIG. 1 shows a color filter 230 displaying one of the primary colors and disposed on a region of the upper panel 200. Unlike what is shown in FIG. 1, the color filter 230 may be provided on or under the subpixel electrodes 191h and 191l of the lower panel 100.

An exemplary embodiment of, a liquid crystal display according to the present invention will be described in detail with reference to FIG. 3 to FIG. 7.

Figure 3:
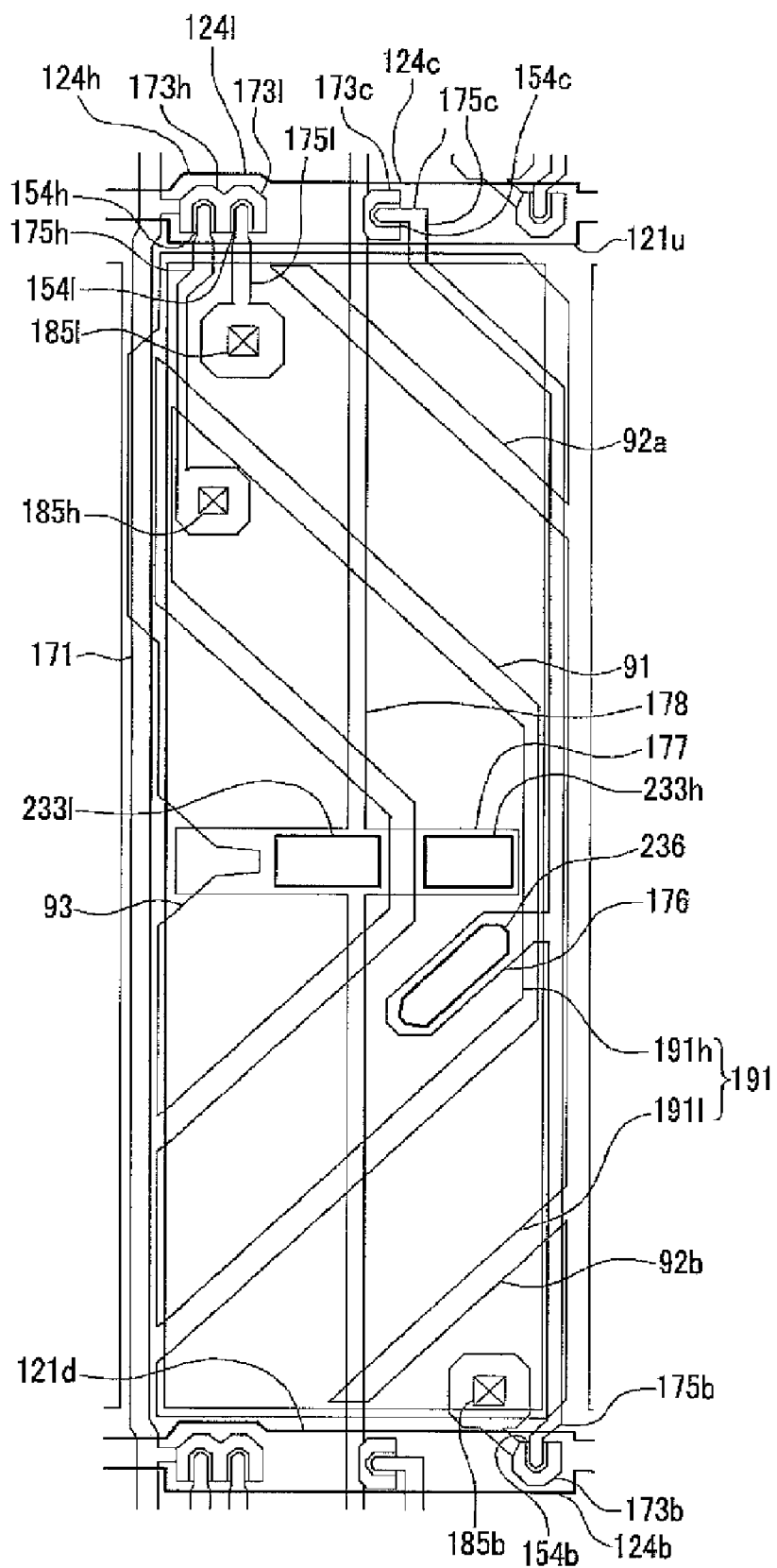
FIG. 3 is a layout view of a lower panel of a liquid crystal display according to an exemplary embodiment of the present invention.
Figure 4:
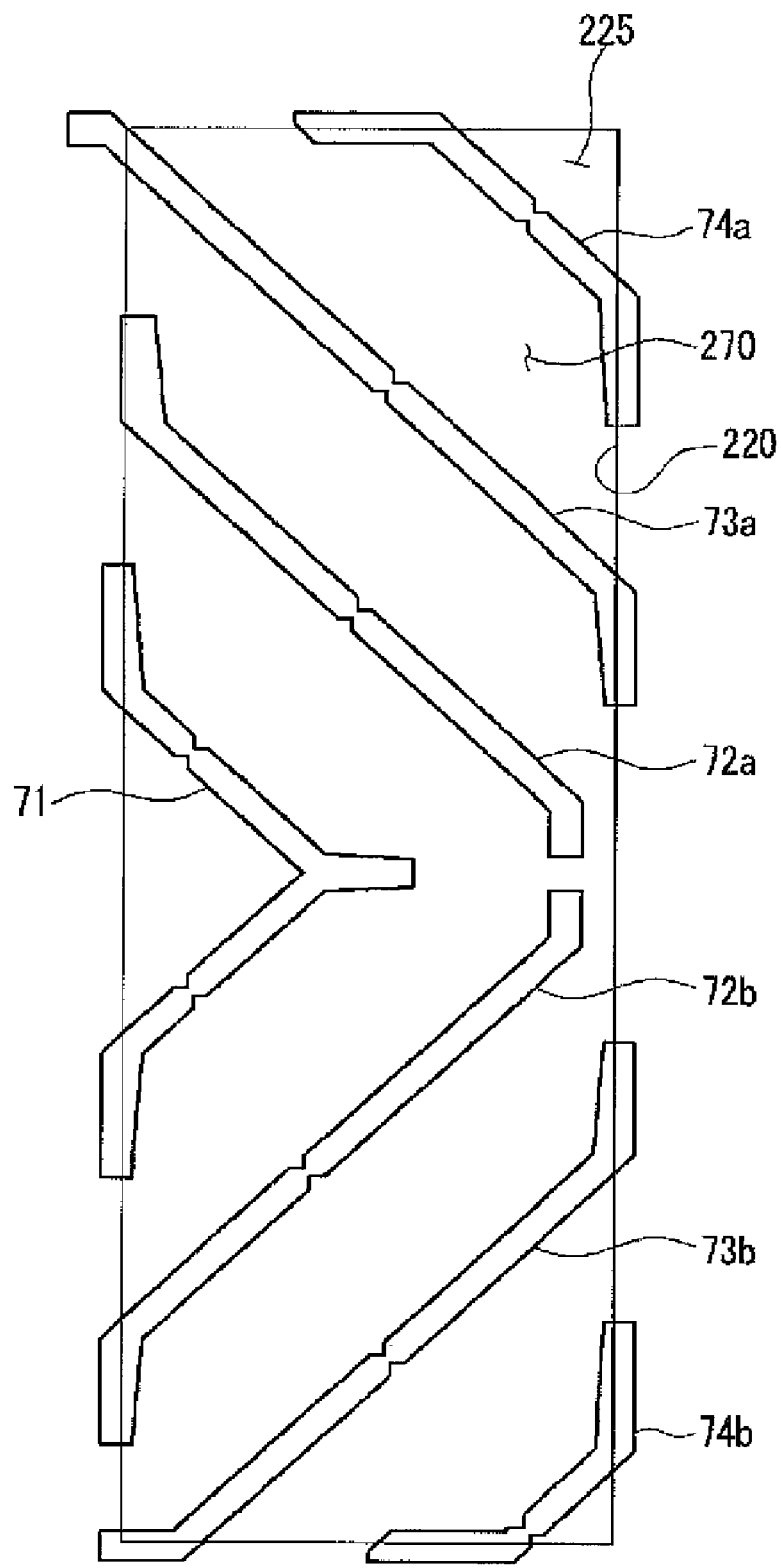
FIG. 4 is a layout view of an upper panel of a liquid crystal display according to an exemplary embodiment of the present invention.
Figure 5:
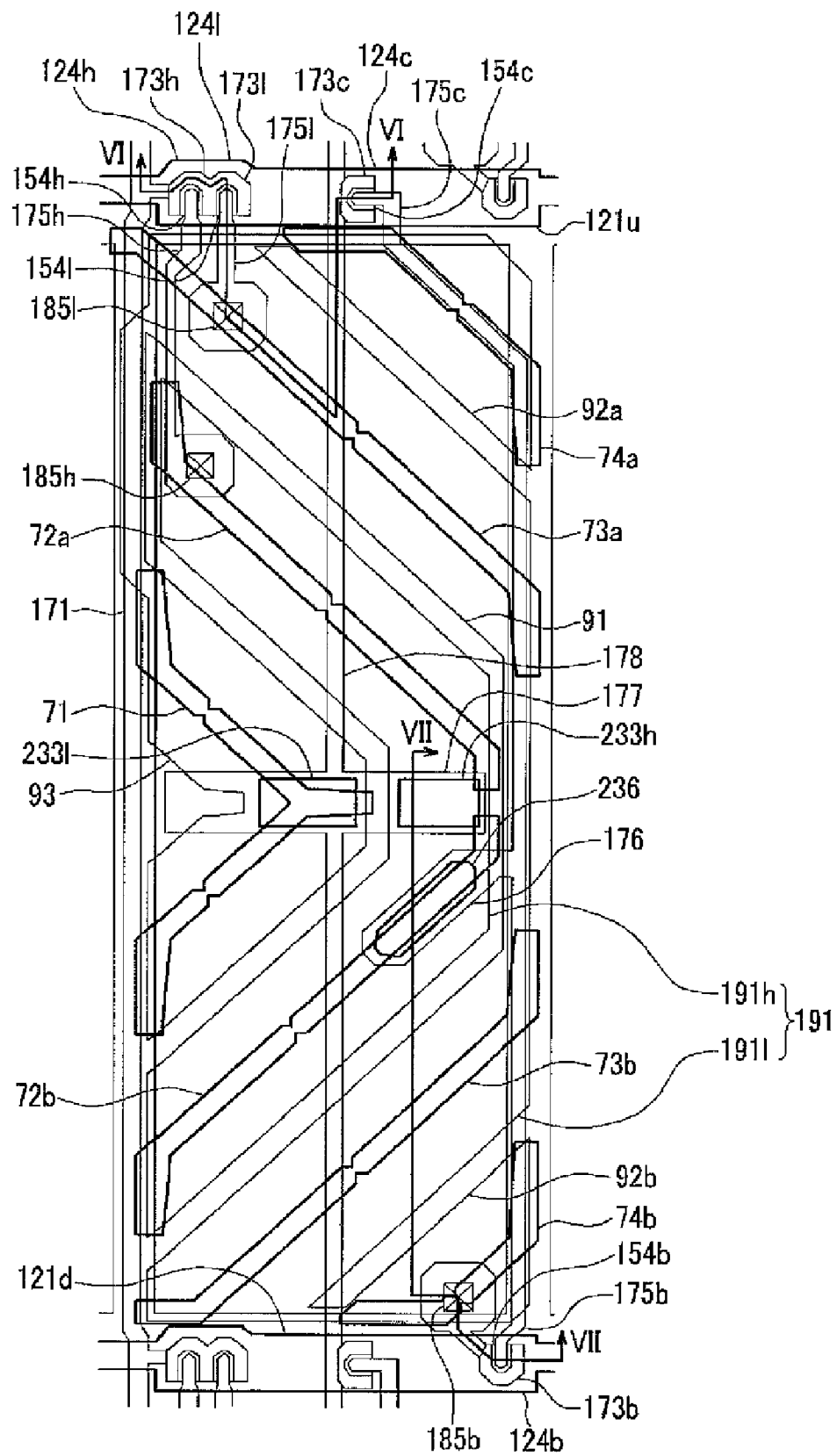
FIG. 5 is a layout view of a liquid crystal display including the lower panel of FIG. 3 and the upper panel of FIG. 4.
Figure 6:
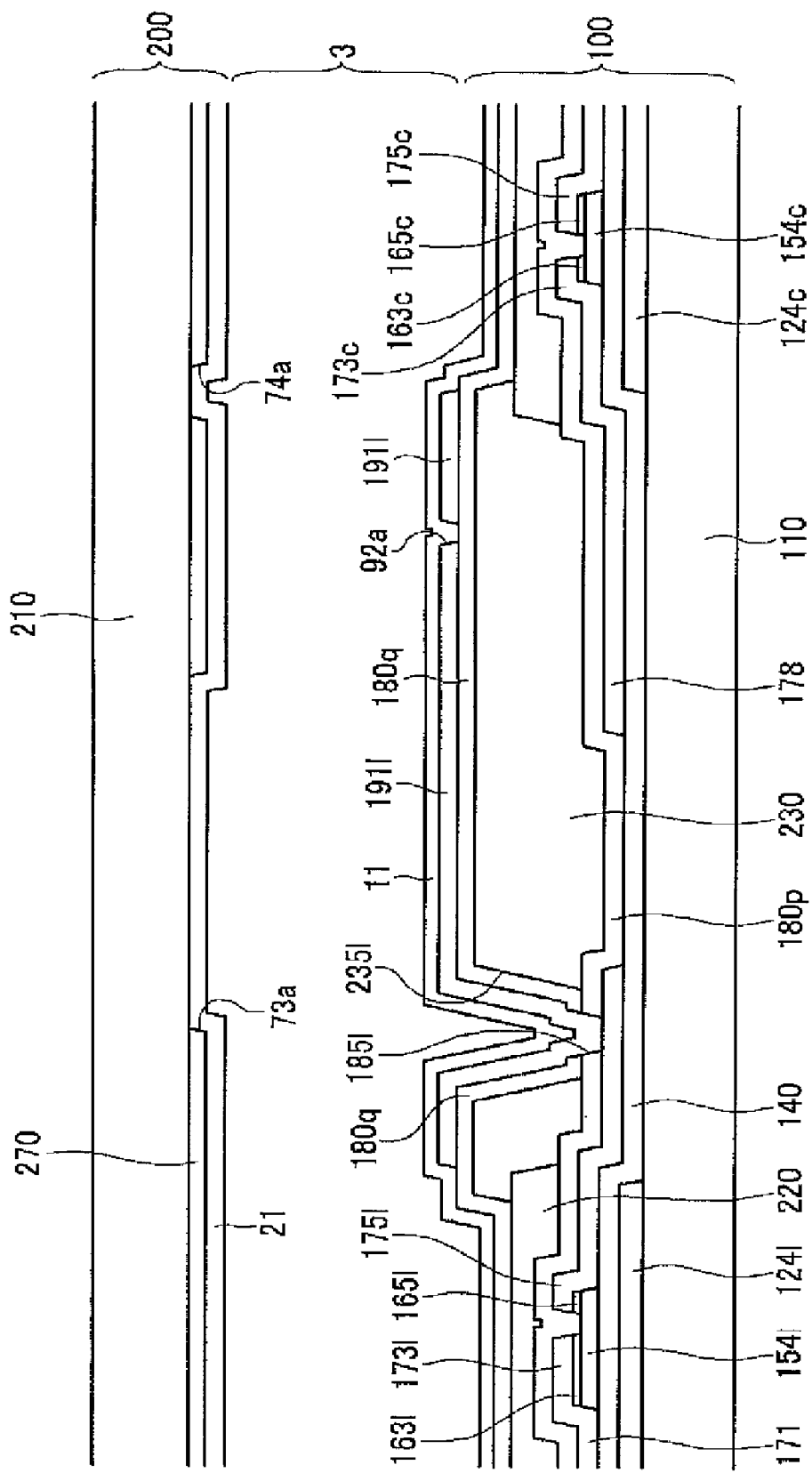
FIG. 6 is a cross-sectional view of the liquid crystal display of FIG. 5 taken along the line VI-VI.
Figure 7:
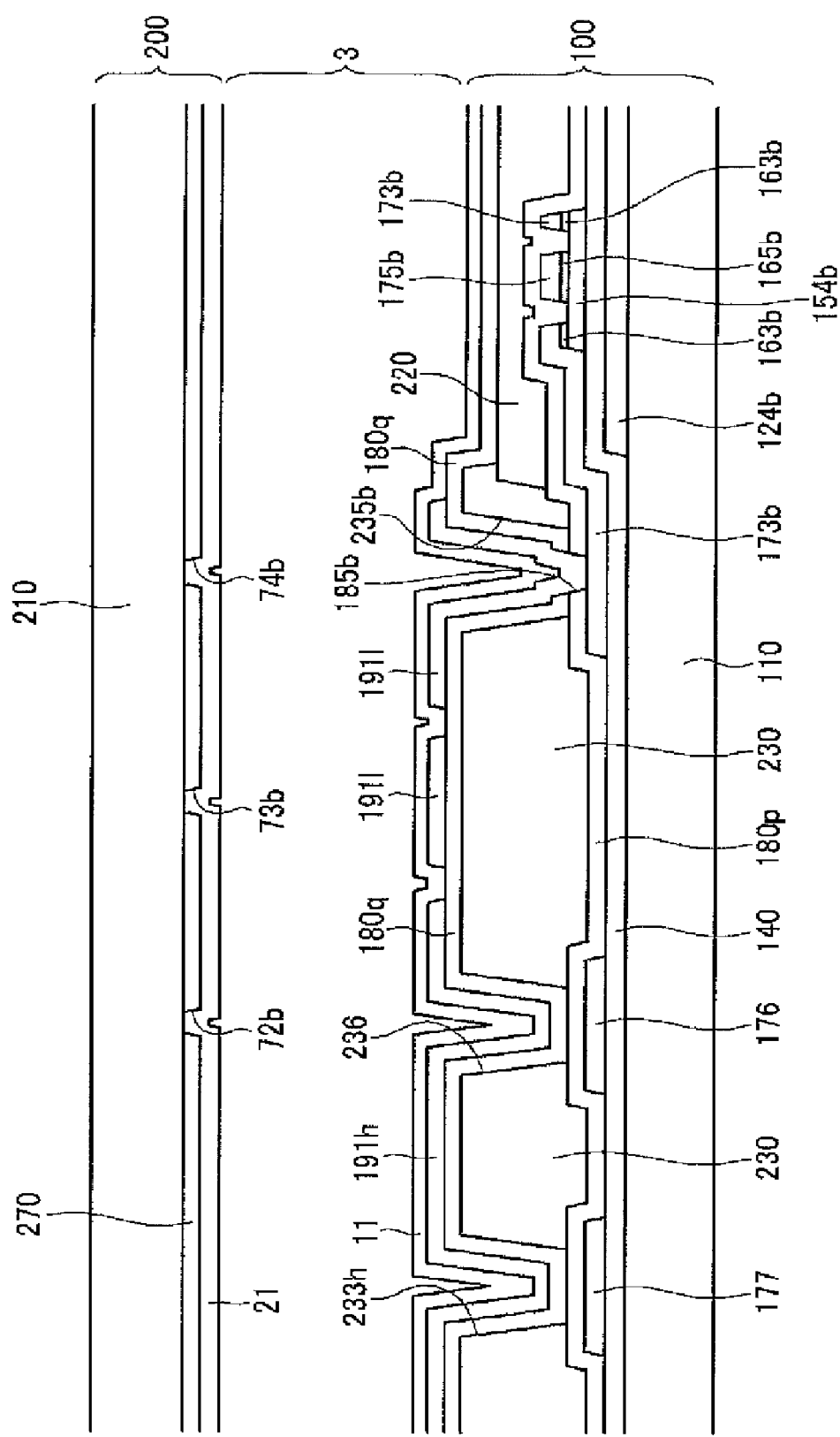
FIG. 7 is a cross-sectional view of the liquid crystal display of FIG. 5 taken along the line VII-VII.

FIG. 3 is a layout view of a lower panel of a liquid crystal display according to an exemplary embodiment of the present invention, FIG. 4 is a layout view of an upper panel of a liquid crystal display according to an exemplary embodiment of the present invention, FIG. 5 is a layout view of a liquid crystal display including the lower panel of FIG. 3 and the upper panel of FIG. 4, FIG. 6 is a cross-sectional view of the liquid crystal display of FIG. 5 taken along the line VI-VI, and FIG. 7 is a cross-sectional view of the liquid crystal display of FIG. 5 taken along the line VII-VII.

Referring to FIG. 3 to FIG. 7, a liquid crystal display according to an exemplary embodiment of the present invention includes a lower panel 100 and an upper panel 200 facing each other, and a liquid crystal layer 3 disposed between the two panels 100 and 200, as shown in FIGS. 6 and 7.

First, the lower panel 100 will be described.

A plurality of gate lines 121u and 121d are formed on an insulating substrate 110, which is shown in FIGS. 6 and 7.

The gate lines 121u and 121d transmit gate signals and extend in a transverse direction. For convenience, in FIG. 3 and FIG. 4, the gate line 121u disposed toward the top of the figure is referred as an upper gate line 121u and the gate line 121d disposed toward the bottom of the figure is referred as a lower gate line 121d. There is no difference, however, between the functions of the upper gate line 121u and the lower gate line 121d. The gate lines 121u and 121d include gate electrodes 124h, 124l, 124c, and 124b protruding upward and downward.

The gate lines 121u and 121d are formed on a gate insulating layer 140, and a plurality of first, second, third, and fourth semiconductor islands 154h, 154l, 154c, and 154b preferably made of amorphous or crystallized silicon are formed on a gate insulating layer 140 shown in FIGS. 6 and 7.

Pairs of ohmic contacts 163c and 165c/163l and 165l/163b and 165b are formed on the semiconductors 154c/154l/154b, respectively, and a pair of ohmic contacts (not shown) is also formed on each of the semiconductors 154h. The ohmic contacts 163b, 165b, 163c, 165c, 163l, and 165l may be made of silicide or n+ hydrogenated amorphous silicon (a-Si) heavily doped with an n-type impurity.

A plurality of data conductors including a plurality of data lines 171, a plurality of common voltage lines 178, a plurality of first second, and third drain electrodes 175h, 175l, and 175c, and electrode members 173b are formed on the ohmic contacts 163b, 165b, 163c, 165c, 163l, and 165l, and the gate insulating layer 140.

The data lines 171 transmit data signals and extend in a longitudinal direction, thereby intersecting the gate lines 121u and 121d. The data lines 171 include first and second source electrodes 173h and 173l extending toward the first and second gate electrodes 124h and 124l so as to form a shape of the character "M".

Common voltage lines 178 transmit the common voltage and extend substantially parallel to the data lines 171, thereby intersecting the gate lines 121u and 121d. The common voltage lines 178 include third source electrodes 173c and storage conductors 177. The third source electrode 173c extends toward the third gate electrode 124c and is curved so as to form a shape of the character "C". The storage conductor 177 is disposed between two neighboring gate lines 121u and 121d, protrudes from both sides of the common voltage line 178 so as to extend in the transverse direction, and has a wider width than other portions of the common voltage line 178.

One end of the first/second drain electrode 175h/175l faces the first/second source electrode 173h/173l with respect to the first/second gate electrode 124h/124l, and portions thereof are enclosed by the first/second source electrode 173h/173l. The other end of the first/second drain electrode 175h/175l has a wide area for contact with another layer.

The third drain electrode 175c starts from one end facing the third source electrode 173c with respect to the third gate electrode 124c, obliquely extends downwardly toward the right, and extends downwardly substantially parallel to the data line 171, and forms a fourth drain electrode 175b at the bottom. The end of the fourth drain electrode 175b is enclosed by the electrode member 173b. The third drain electrode 175c also includes a boosting electrode 176 obliquely protruding below the storage conductor 177.

One end of the electrode member 173b faces the fourth drain electrode 175b to form the fourth source electrode 173b, and the other end thereof has a wide area for contact with another layer of the display.

The shape and the arrangement of the data conductors 171, 173b, 175h, 175l, 175c, and 178, however, may be changed so as to be in various forms.

A first/second/third/fourth gate electrode 124h/124l/124c/124b, a first/second/third/fourth source electrode 173h/173l/173c/173b, and a first/second/third/fourth drain electrode 175h/175l/175c/175b form a first/second/third/fourth thin film transistor (TFT) Qh/Ql/Qc/Qb along with a first/second/third/fourth semiconductor island 154h/154l/154c/154b. The channel of the first/second/third/fourth thin film transistor Qh/Ql/Qc/Qb is formed on the first/second/third/fourth semiconductor island 154h/154l/154c/154b between the first/second/third/fourth source electrode 173h/173l/173c/173b and the first/second/third/fourth drain electrode 175h/175l/175c/175b.

Ohmic contacts 163l, 165l, 163c, 165c, 163b, and 165b are disposed between the semiconductor islands 154l, 154c, and 154b and the source electrodes 173l, 173c, and 173b and the drain electrodes 175l, 175c, and 175b, thereby reducing the contact resistance therebetween. The semiconductor islands 154h, 154l, 154c, and 154b include exposed portions not covered by the data lines 171 and the drain electrodes 175h, 175l, 175c, and 175b, such as the portions between the source electrodes 173h, 173l, 173c, and 173b and the drain electrodes 175h, 175l, 175c, and 175b.

A lower passivation layer 180p made of an inorganic insulator such as silicon nitride or silicon oxide is formed on the data conductors 171, 173b, 175h, 175l, 175c, and 178 and the exposed semiconductors 154h, 154l, 154c, and 154b, as shown in FIGS. 6 and 7.

A plurality of light blocking members 220 separated from each other with a predetermined interval so as to construct a black matrix are formed on the lower passivation layer 180p. The light blocking members 220 prevent light leakage and include a plurality of openings 225. The light blocking members may further include quadrangle portions (not shown) corresponding to the thin film transistors.

A plurality of color filters 230 are formed on the lower passivation layer 180p and on the light blocking members 220, with the color filters 230 being disposed in the regions enclosed by the light blocking members 230. The color filters 230 have a plurality of through holes 235l and 235b disposed on the first and second drain electrodes 175h and 175l and the electrode member 173b, and a plurality of openings 233h, 233l, and 236 disposed on the storage conductor 177 and the boosting electrode 176. The openings 233h, 233l, and 236 decrease the thickness of the dielectric material thereby increasing the storage capacitance.

In this exemplary embodiment, the lower passivation layer 180p can prevent the pigments of the color filters 230 from migrating into the exposed semiconductors 154h, 154l, 154c, and 154b.

An upper passivation layer 180q is formed on the light blocking members 220 and the color filters 230. The upper passivation layer 180q may be made of an inorganic insulating material, such as silicon nitride or silicon oxide, and prevents the color filters 230 from lifting and suppresses contamination of the liquid crystal layer 3 by any organic material, such as a solvent, from the color filters 230. In this way problems, such as an afterimage that may be generated upon driving the display, may be prevented.

At least one of the light blocking members 220 and the color filters 230, however, may be disposed on the upper panel 200, and one of the lower passivation layers 180p and the upper passivation layer 180q of the lower panel 100 may be omitted in such a configuration.

The upper passivation layer 180q and the lower passivation layer 180p have a plurality of contact holes 185h, 185l, and 185b formed therein for exposing the first and second drain electrodes 175h and 175l and the electrode member 173b.

A plurality of pixel electrodes 191 are formed on the upper passivation layer 180q, and the color filters 230 may be extended to follow the columns of the pixel electrodes 191.

Each pixel electrode 191 is approximately a quadrangle in shape and includes first and second subpixel electrodes 191h and 191l that are engaged with each other with a gap 91 formed therebetween. The first subpixel electrode 191h is formed in the center of the second subpixel electrode 191l, and the gap 91 includes a pair of longitudinal portions and a pair of oblique portions respectively disposed on upper and lower sides.

The second sub-pixel electrode 191l includes lower and upper cutouts 92a and 92b, and a central cutout 93. The upper cutout 92a and the lower cutout 92b start from the right edge of the second subpixel electrode 191l and obliquely extend toward the upper edge and the lower edge, respectively. The central cutout 93 is disposed on the center of the left edge of the second subpixel electrode 191l, and a transverse portion and an oblique portion thereof extend to follow the storage conductor 177 in the transverse direction.

The oblique portions of the gap 91, the oblique portions of the central cutout 93, and the lower and upper cutouts 92a and 92b, are inclined with respect to the gate lines 121u and 121d by an angle of about 45°.

The lower portion of the pixel electrode 191 is partitioned into four regions by the lower cutout 92b, the central cutout 93, and the gap 91, and the upper portion of the pixel electrode 191 is partitioned into four regions by the upper cutout 92a, the central cutout 93, and the gap 91. The number of regions or cutouts may vary depending on design factors, such as the size of the pixel electrode 191, the length ratio of the horizontal side and the vertical side of the pixel electrode 191, the type of liquid crystal layer 3, or other characteristics In this exemplary embodiment, the area of the second subpixel electrode 191l may be in the range of 1.0 to 2.2 times the area of the first subpixel electrode 191h.

The first/second subpixel electrode 191h/191l is physically and electrically connected to the first/second drain electrode 175h/175l through the contact hole 185h/185l to receive data voltages from the first/second drain electrode 175h/175lb. Also, the second subpixel electrode 191l is physically and electrically connected to the fourth source electrode 173l through the contact hole 185b.

An alignment layer 11 is formed on the pixel electrode 191.

Next, the upper panel 200 will be described.

A common electrode 270 is formed on an insulating substrate 210. The common electrode 270 includes a set of cutouts 71, 72a, 72b, 73a, 73b, 74a, and 74b, as shown in FIG. 4. Each cutout 71-74b includes at least one oblique portion parallel to the upper or lower cutout 92b or 92a of the pixel electrode 191. The oblique portions of the cutouts 71-74b include notches having a triangular shape.

An alignment layer 21 is formed on the common electrode 270 and the substrate 210.

Each of the alignment layers 11 and 21 may be a vertical alignment layer.

Polarizers (not shown) may be provided on the outer surface of the display panels 100 and 200.

The liquid crystal layer 3 between the lower panel 100 and the upper panel 200 has negative dielectric anisotropy, and may be oriented such that the major axes of the liquid crystal molecules of the liquid crystal layer 3 are almost perpendicular to the surfaces of the two display panels 100 and 200 when no electric field is applied. The gate lines 121u and 121d are applied with gate signals, and the first and second subpixel electrodes 191h and 191l that are supplied with data voltages form an electric field along with the common electrode that is supplied with the common voltage. Then, the liquid crystal molecules of the liquid crystal layer 3 change direction so that their major axes become perpendicular to a direction of the electric field. The degree of polarization of the light that is incident to the liquid crystal layer 3 is changed according to the degree of inclination of the liquid crystal molecules, and this change in the polarization angle appears as a change of light transmittance by the polarizer, and in this way the liquid crystal display displays images.

The first/second subpixel electrode 191h/191l and the common electrode 270 form the first/second liquid crystal capacitor Clch/Clcl along with the liquid crystal layer 3 therebetween to maintain the applied voltages even after the first/second thin film transistor Qh/Ql is turned off.

The first/second subpixel electrode 191h/191l overlaps the storage conductor 177 of the common voltage line 178 transmitting the common voltage with the lower/upper passivation layer 180p and 180q interposed therebetween in the opening 233h/233l, so as to form the storage capacitor Csth/Cstl in order to enhance the voltage storing capacity of the first/second liquid crystal capacitor Clch/Clcl. In this exemplary embodiment, the color filters 230 are not present in the openings 233h and 233l such that the subpixel electrodes 191h and 191l and the storage conductor 177 overlap each other only with the lower and upper passivation layers 180p and 180q made of inorganic insulators interposed therebetween, so that it is possible to obtain sufficient storage capacitance while reducing the area of the storage capacitors Csth and Cstl. Accordingly, the aperture ratio of the liquid crystal display can be improved.

Also, the first subpixel electrode 191h overlaps the boosting electrode 176 with only the lower and upper passivation layers 180p and 180q interposed therebetween in the openings 236 to form the boosting capacitor Cb.

Next, the operation of the liquid crystal display according to an exemplary embodiment of the present invention will be described with reference to FIG. 2 to FIG. 7.

First, an example in which data voltages applied to the data lines 171 have positive polarity with reference to the common voltage will be described.

If the gate-on voltage is applied to the upper gate line 121u, the first to third thin film transistors Qh, Ql, and Qc connected thereto are turned on.

Accordingly, data voltages that are applied to the data line 171 are transmitted to the first and second sub-pixel electrodes 191h and 191l through the first and second thin film transistors Qh and Ql that are turned on. Therefore, the voltages of the first and second subpixel electrodes 191h and 191l are equal to each other. The first/second liquid crystal capacitor Clch/Clcl is charged with a voltage corresponding to a difference between the common voltage of the common electrode 270 and the voltage of the first/second subpixel electrode, so that the voltages stored in the first and second liquid crystal capacitors Clch Clcl are the same. Also, positive charges are gathered in the first and second subpixel electrodes 191h and 191l.

On the other hand, when the common voltage of the common voltage line 178 is applied to the boosting electrode 176 through the third thin film transistor Qc, the boosting capacitor Cb is charged with a voltage corresponding to a difference between the voltage of the first subpixel electrode and the common voltage, and negative charges are gathered in the boosting electrode 176.

Then, if the upper gate line 121u is supplied with the gate-off voltage and the lower gate line 121d is supplied with the gate-on voltage, the first to third thin film transistors Qh, Ql, and Qc that are connected to the upper gate line 121u are turned off, and the fourth thin film transistor Qb that is connected to the lower gate line 121d is turned on.

In response to turning off the first to third thin film transistors Qh, Ql, and Qc, the first and second subpixel electrodes 191h and 191l and the boosting electrode 176 are floated, and the second subpixel electrode 191l and the boosting electrode 176 are connected to each other in response to turning on the fourth thin film transistor Qb. Thus, the positive charges gathered on the second subpixel electrode 191l and the negative charges gathered on the boosting electrode 176 are mixed, so that the voltage of the second subpixel electrode 191l is decreased and the voltage of the boosting electrode 176 is increased. If the voltage of the boosting electrode 176, which forms one terminal of the boosting capacitor Cb, is increased, the voltage of the first subpixel electrode 191h that is floated is increased, so that the voltage stored in the first liquid crystal capacitor Clch is increased. On the other hand, the voltage of the second subpixel electrode 191l is decreased, so that the voltage stored in the second liquid crystal capacitor Clcl is decreased.

In an exemplary embodiment of the present invention, if the area of the second subpixel electrode 191l is larger than the area of the first subpixel electrode 191h, the charge stored in the second liquid crystal capacitor Clcl is larger than the charge stored in the first liquid crystal capacitor Clch, so that the amount of voltage increase of the first subpixel electrode 191h is larger than the amount of voltage drop of the second subpixel electrode 191h.

In contrast, in the case in which the data voltage applied to the data line 171 has a negative polarity with reference to the common voltage, the charges present at the two terminals of the capacitors Clch, Clcl, Csth, Cstl, and Cb will have the opposite polarity than in the above-described situation. If the lower gate line 121d is supplied with the gate-on voltage such that the fourth thin film transistor Qb is turned on, the negative voltage of the second subpixel electrode 191l is increased causing the difference between the voltage of the second subpixel electrode 191l and the common voltage to be decreased, so that the voltage stored in the second liquid crystal capacitor Clcl is decreased. Simultaneously, the voltage of the boosting electrode 176, which is positive, is decreased such that the voltage of the first subpixel electrode 191h, which is negative, is also decreased, so that the difference between the voltage of the first subpixel electrode 191h and the common voltage is further increased. Accordingly, the charged voltage of the first liquid crystal capacitor Clch is increased.

According to the present exemplary embodiment, the charged voltage of the first liquid crystal capacitor Clch can always be larger than the charged voltage of the second liquid crystal capacitor Clcl, regardless of the polarity of the data voltages.

According to the present exemplary embodiment the charged voltages of the first and second liquid crystal capacitors Clch and Clcl can differ from each other without any reduction of total luminance and transmittance, so that the luminance of the two subpixels PXh and PXl may be different from each other. If the voltages of the first and second liquid crystal capacitors Clch and Clcl are appropriately controlled, the images seen from the side may approximate to the image seen from the front, that is to say, the gamma curve of the side may be approximately close to the gamma curve of the front, thereby improving the side visibility and increasing the transmittance.

Also, whenever the gate line 121u is applied with the gate-on voltage, the voltage of the boosting capacitor Cb is refreshed by the third thin film transistor Qc to the common voltage, so that the afterimage of the previous frame is removed.

Furthermore, in the present exemplary embodiment, the common voltage line 178 transmitting the common voltage is formed in the same layer as the third source electrode 173c or the third drain electrode 175c of the third switching element Qc, so that more than two contact holes are not needed as compared with the case of forming the common voltage line 178 in a different layer. In this way, the process may be simplified in the case that the color filters 230 are formed on the lower panel 100, as in the present exemplary embodiment, and the aperture ratio may also be increased.

Next, a liquid crystal display according to exemplary embodiments of the present invention will be described with reference to FIG. 8 to FIG. 12, as well as to FIG. 1 and FIG. 2.

Figure 8:
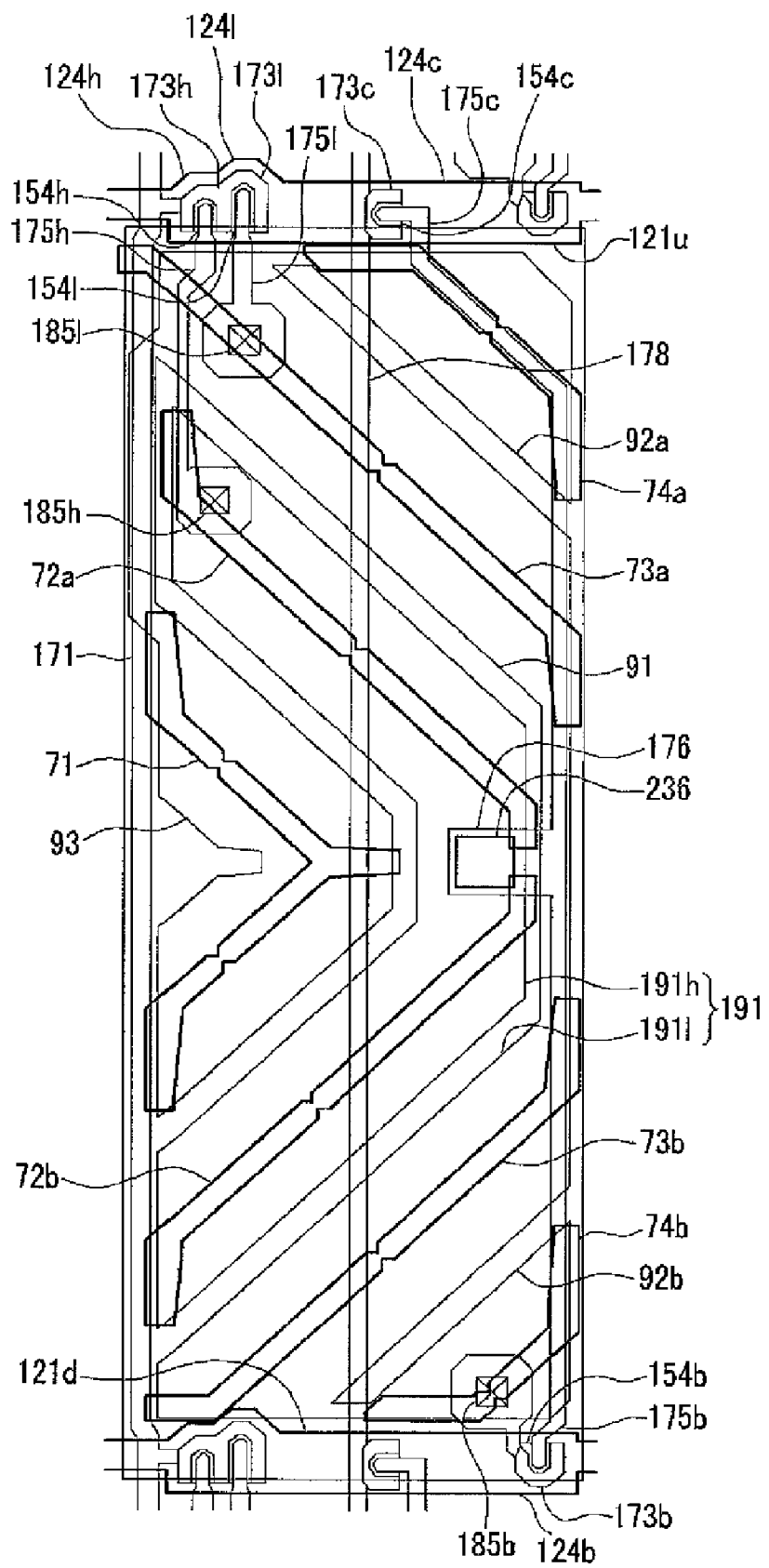
FIG. 8, FIG. 9, and FIG. 10 are layout views of liquid crystal displays according to an exemplary embodiment of the present invention.
Figure 9:
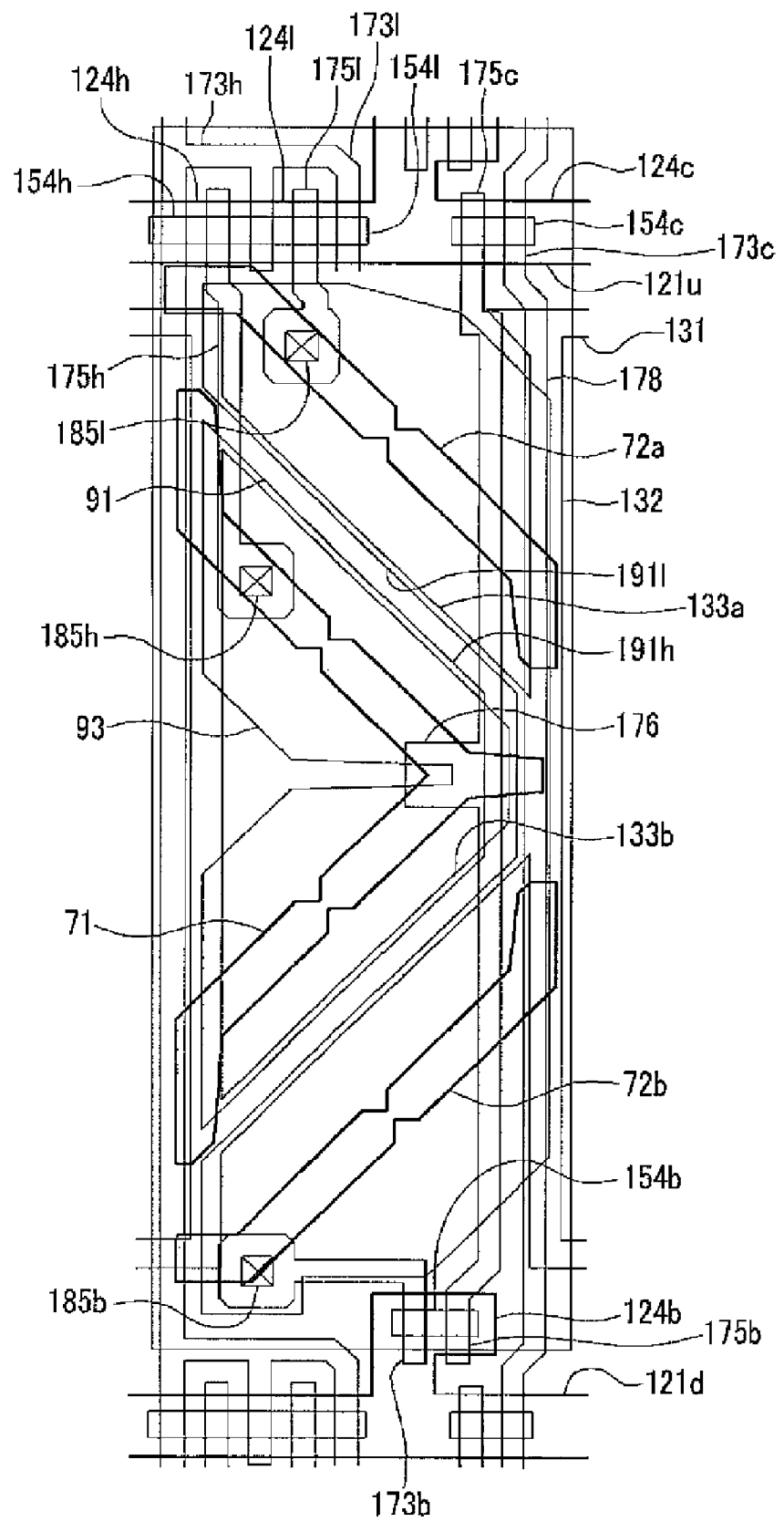
Figure 10:
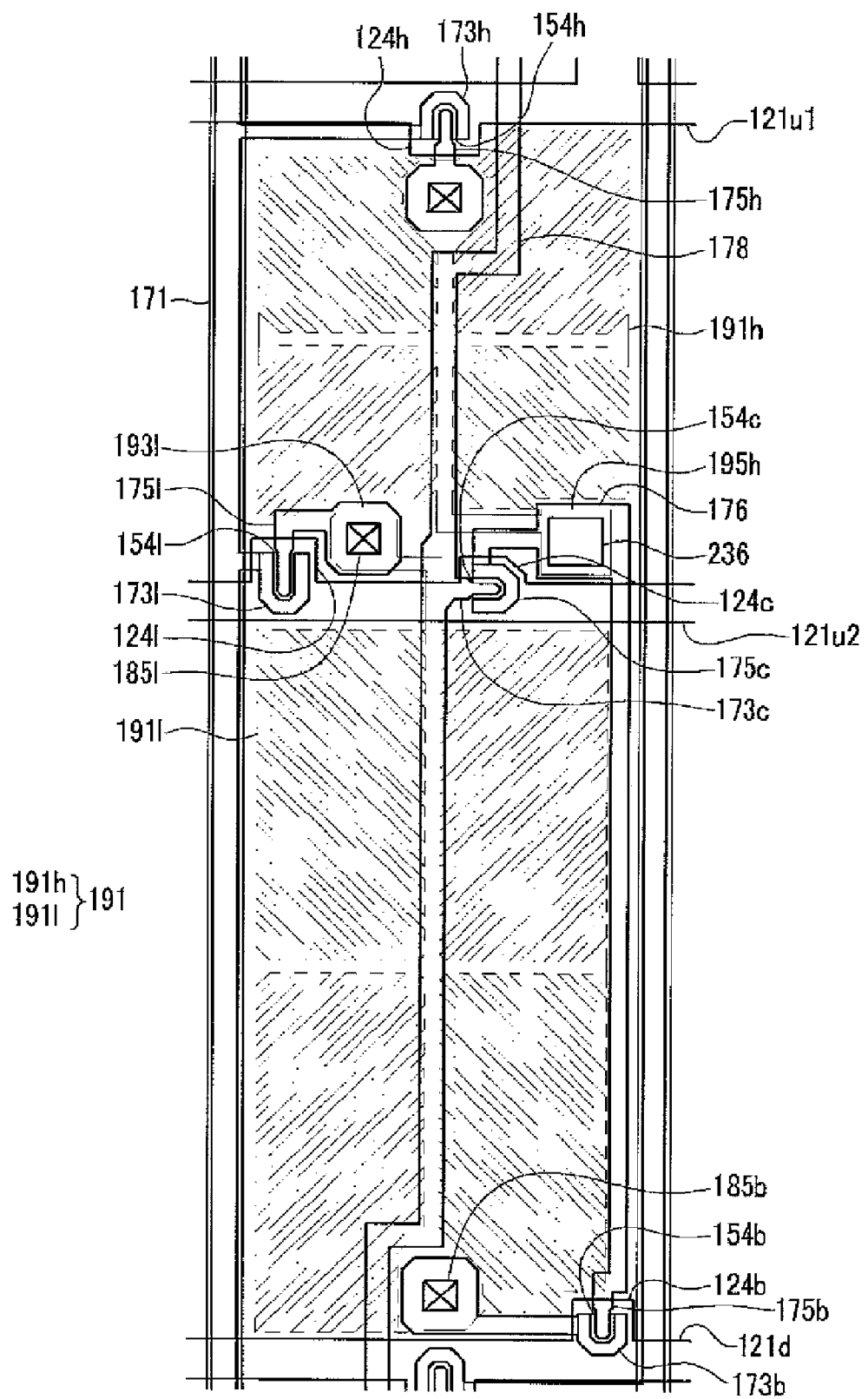
Figure 11:
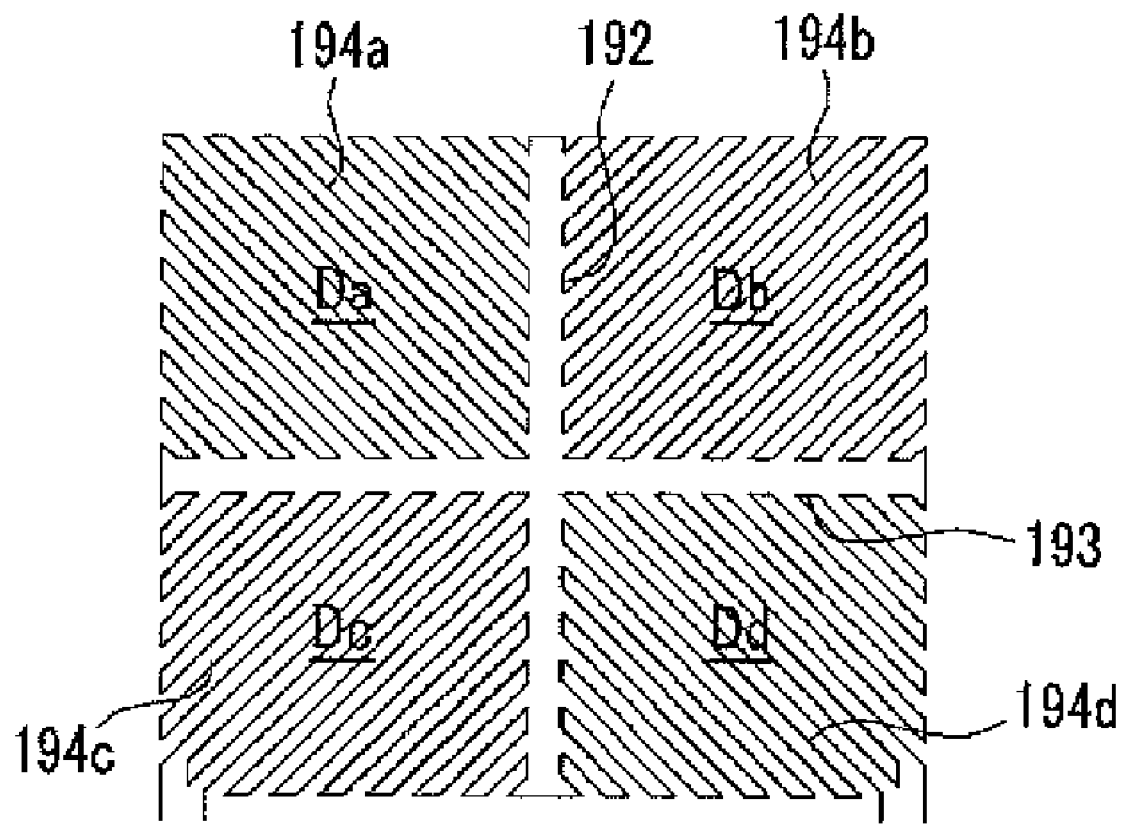
FIG. 11 is a top plan view of a basic electrode for the pixel electrode of the liquid crystal display shown in FIG. 10.
Figure 12:
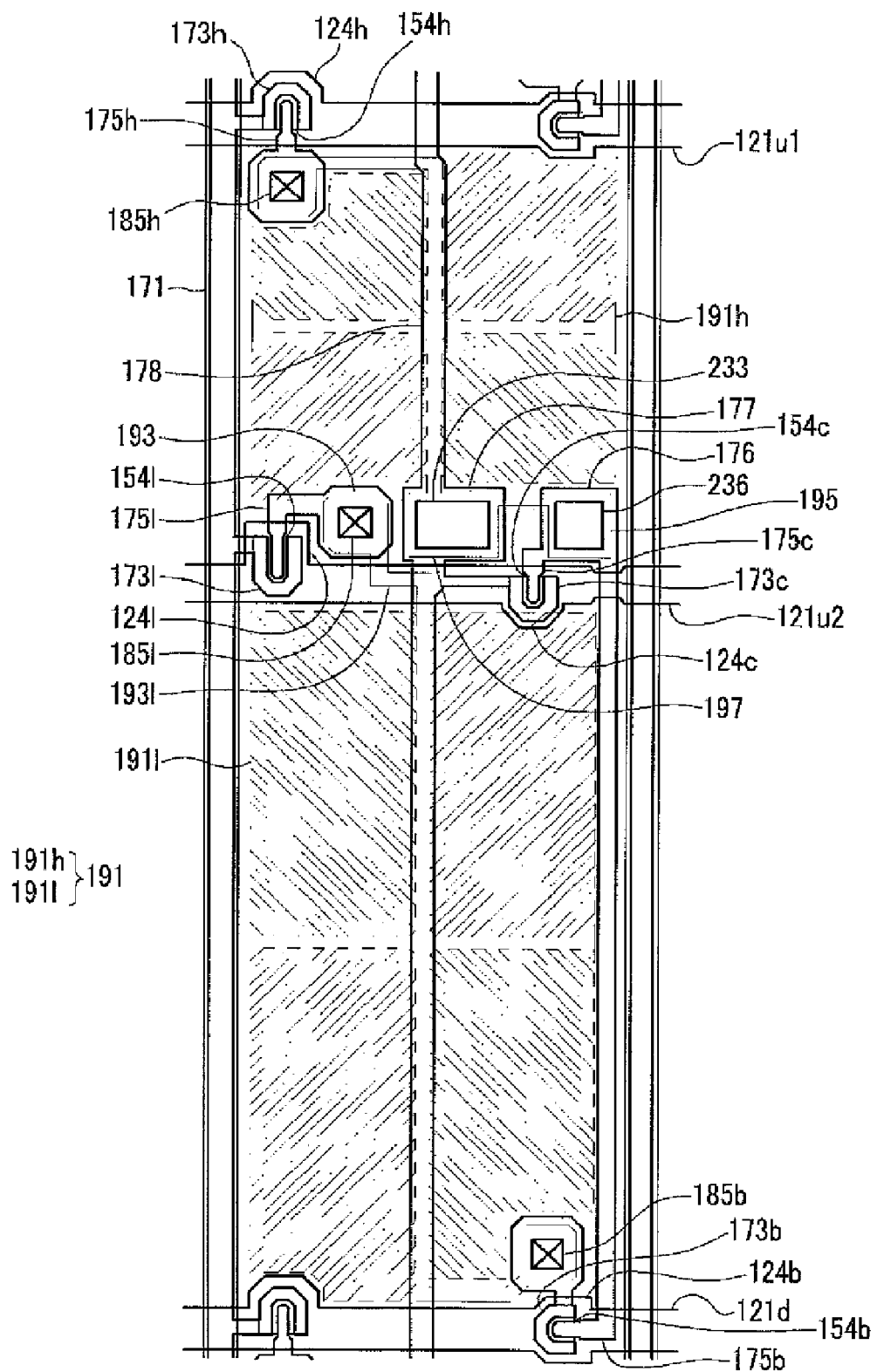
FIG. 12 is a layout view of a liquid crystal display according to an exemplary embodiment of the present invention.

FIG. 8 to FIG. 10 are layout views of liquid crystal displays according to an exemplary embodiment of the present invention, FIG. 11 is a top plan view of a basic electrode for the pixel electrode of the liquid crystal display shown in FIG. 10, and FIG. 12 is a layout view of a liquid crystal display according to an exemplary embodiment of the present.

The layered structures of a liquid crystal displays shown in FIG. 8 to FIG. 10 and FIG. 12 are almost the same as those of the liquid crystal display shown in FIG. 3 to FIG. 7. Hereafter, the points that differ from the exemplary embodiment shown in FIG. 3 to FIG. 7 will be described.

Referring to FIG. 8, unlike the previous exemplary embodiment, a common voltage line 178 does not include a storage conductor 177, and the color filters 230 do not have openings 233h and 233l, as was shown in the exemplary embodiment of FIG. 3 to FIG. 7. Accordingly, the storage capacitors Csth and Cstl are not utilized in the present exemplary embodiment, thereby further improving the aperture ratio and the transmittance.

Also, the third drain electrode 175c includes a boosting electrode 176 extending downward and protruding in the left transverse direction and shaped as a quadrangle, and forms a boosting capacitor Cb by overlapping the first subpixel electrode 191h through the opening 236 of the color filter 230.

The operation and effects of the liquid crystal display according to the present exemplary embodiment are the same as those of the previously described exemplary embodiment.

Next, referring to FIG. 9, a liquid crystal display according to an exemplary embodiment of the present invention will be described with a focus on differences from the previously described exemplary embodiment.

Referring to FIG. 9, a storage electrode line 131 is further formed on the insulating substrate (not shown), and the storage electrode line 131 includes a stem 132 extending in the longitudinal direction and branches 133a and 133b obliquely extending upward and downward from the stem 132. The stem 132 prevents crosstalk between the data line 171 and the pixel electrode 191, and the brandies 133a and 133b overlap the gap 91 between the first subpixel electrode 191h and the second subpixel electrode 191l, thereby preventing light leakage.

Also, in the present exemplary embodiment, the common voltage line 178 is disposed on the right side of the third drain electrode 175c and does not include any storage conductor 177. In addition, the third drain electrode 175c includes a boosting electrode 176 shaped as a quadrangle and protruding in the left transverse direction.

The color filters 230 include only the through holes (not shown) for the contact holes 185h, 185l, and 185b without any additional openings.

Each pixel electrode 191 includes first and second subpixel electrodes 191h and 191l that are engaged with each other and have a gap 91 interposed therebetween, and a central cutout 93 is formed on the center of the left edge of the first subpixel electrode 191h.

A common electrode 270 of an upper panel 200 includes a set of cutouts 71, 72a, and 72b that are parallel to the gap 91.

According to the present exemplary embodiment the common voltage line 178 is disposed on the edge of the pixel PX such that the aperture ratio and the transmittance may be further improved.

Next, a liquid crystal display according to an exemplary embodiment of the present invention will be described with reference to FIG. 10 and FIG. 11 with a focus on differences from the previously described exemplary embodiment.

Gate lines 121u1 and 121u2 that are formed on a substrate (not shown) and parallel to each other are simultaneously supplied with gate signals. The gate line 121u1 includes a first gate electrode 124h protruding downward, the gate line 121u2 includes a second gate electrode 124l and a third gate electrode 124c each protruding upwardly, and the next gate line 121d includes a fourth gate electrode 124b also protruding upwardly.

The data line 171 includes a first/second source electrode 173h/173l extending toward the first/second gate electrode 124h/124l, and the common voltage line 178 crossing the center of the pixel PX in the longitudinal direction includes a third source electrode 173c extending toward the third gate electrode 124c.

One end of the third drain electrode 175c is curved to enclose the third source electrode 173c and includes a boosting electrode 176 having a wide area on the right side. The third drain electrode 175c extends downwardly from the boosting electrode 176 to form a fourth drain electrode 175b.

The color filter 230 includes a plurality of quadrangular openings 236 on the boosting electrode 176.

The pixel electrode 191 includes the first and second subpixel electrodes 191h and 191l that are separated from each other, and the first and second subpixel electrodes 191h and 191l respectively include one basic electrode shown in FIG. 11.

Referring to FIG. 11, the overall shape of the basic electrode is a quadrangle, and includes a stem in the form of a cross having a transverse stem 193 and a longitudinal stem 192. The basic electrode is divided into a first subregion Da, a second subregion Db, a third subregion Dc, and a fourth subregion Dd by the transverse stem 193 and the longitudinal stem 192, and each of the four subregions Da-Dd includes a plurality of first to fourth minute branches 194a, 194b, 194c, and 194d.

The first minute branch 194a obliquely extends from the transverse stem 193 or the longitudinal stem 192 in the upper-left direction, and the second minute branch 194b obliquely extends from the transverse stem 193 or the longitudinal stem 192 in the upper-right direction. Also, the third minute branch 194c obliquely extends from the transverse stem 193 or the longitudinal stem 192 in the lower-left direction, and the fourth minute branch 194d obliquely extends from the transverse stem 193 or the longitudinal stem 192 in the lower-right direction.

The first to fourth minute branches 194a-194d form an angle of about 45 degrees or 135 degrees with the gate lines 121 or with the transverse stem 193. Also, the minute branches 194a-194d of two neighboring subregions Da-Dd are arranged to be vertical relative to each other.

The first subpixel electrode 191h is disposed above the second subpixel electrode 191l, the lower portion of the longitudinal stem of the first subpixel electrode 191h extends in the right direction to form an expansion 195h with a quadrangular shape, as shown in FIG. 10. The upper portion of the longitudinal stem of the second subpixel electrode 191l is curved in the left direction to form an expansion 193l. The second subpixel electrode 191l receives data voltages from the second drain electrode 175l through the expansion 193l.

Also, the common electrode 270, as shown in FIG. 1, does not have any cutout and is formed over the entire surface of the substrate (not shown).

In the present exemplary embodiment, the first thin film transistor Qh and the second thin film transistor Ql are connected to respectively different gate lines 121u1 and 121u2, whereas the second thin film transistor Ql and the third thin film transistor Qc are connected to the same gate line 121u2.

In addition, the boosting capacitor Cb is formed by overlapping the expansion 195h of the first subpixel electrode 191h and the boosting electrode 176 with each other in the opening 236.

According to the present exemplary embodiment, it is not necessary to form cutouts in the common electrode 270, and the response speed of the liquid crystal molecules may be improved. Also, the common voltage line 178 overlaps the longitudinal stems of the first and second subpixel electrodes 191h and 191l, so that texture generated near the longitudinal stems may be covered and the aperture ratio improved as well.

Unlike the present exemplary embodiment, a light alignment method in which light, such as ultraviolet rays, is obliquely irradiated onto the alignment layers (not shown) may be used to control the alignment direction and the alignment angle of the liquid crystal molecules, as another means for forming a plurality of subregions Da-Dd where the liquid crystal molecules are inclined in different directions.

Next, a liquid crystal display according to an exemplary embodiment of the present invention will be described with reference to FIG. 12, with a focus on differences from the previously described exemplary embodiment.

A liquid crystal display according to the present exemplary embodiment is similar to the liquid crystal display shown in FIG. 10.

According to the present exemplary embodiment shown in FIG. 12, the common voltage line 178 runs straight without a curved portion, which is different than the liquid crystal display shown in FIG. 10. Accordingly, the aperture ratio of the liquid crystal display is improved.

In addition, an expansion 197 for forming a storage capacitor Csth is formed on the lower portion of the longitudinal stem of the first subpixel electrode 191h, and a contact hole 185h/185l for connection between the first/second subpixel electrode 191h/191l and the first/second drain electrode 175h/175l is disposed on the corner of the first/second subpixel electrode 191h/191l so that the aperture ratio and the transmittance are further increased.

According to exemplary embodiments of the present invention, the transmittance of the liquid crystal display may be increased and the display characteristics, such as the side visibility, may be improved. Also, according to exemplary embodiments of the present invention, the aperture ratio of the liquid crystal display may be increased and the manufacturing process may be simplified.

While the present invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A liquid crystal display comprising:
   a substrate;
   a common voltage line formed on the substrate and transmitting a common voltage;
   a pixel electrode formed on the common voltage line and including a first subpixel electrode and a second subpixel electrode;
   a first thin film transistor connected to the first subpixel electrode and including a first gate electrode, a first source electrode, and a first drain electrode;
   a second thin film transistor connected to the second subpixel electrode and including a second gate electrode, a second source electrode, and a second drain electrode; and
   a third thin film transistor connected to the common voltage line and including a third gate electrode, a third source electrode, and a third drain electrode,
   wherein the common voltage line is formed in the same layer as the third source electrode, and is electrically connected to the third source electrode.

2. The liquid crystal display of claim 1, further comprising:
   a fourth thin film transistor connected to the second subpixel electrodes;
   a first gate line connected to the first gate electrode of the first thin film transistor, the second gate electrode of the second thin film transistor, and the third gate electrode of the third thin film transistor;
   a second gate line connected to a fourth gate electrode of the fourth thin film transistor; and
   a data line connected to the first source electrode of the first thin film transistor and the second source electrode of the second thin film transistor,
   wherein the second gate line is applied with a gate-on voltage after the first gate line is applied with a gate-on voltage.

3. The liquid crystal display of claim 1, further comprising a boosting capacitor connected to the first subpixel electrode and the fourth thin film transistor.

4. The liquid crystal display of claim 3, further comprising a fourth thin film transistor connected to the second subpixel electrode and the boosting capacitor and including a fourth gate electrode, a fourth source electrode, and a fourth drain electrode.

5. The liquid crystal display of claim 4, further comprising:
   a first gate line connected to the first gate electrode of the first thin film transistor, the second gate electrode of the second thin film transistor, and the third gate electrode of the third thin film transistor;
   a second gate line connected to the fourth gate electrode of the fourth thin film transistor; and
   a data line connected to the first source electrode of the first thin film transistor and the second source electrode of the second film transistor,
   wherein the second gate line is applied with a gate-on voltage after the first gate line is applied with a gate-on voltage.

6. The liquid crystal display of claim 5, wherein the common voltage line is parallel to the data line and overlaps the pixel electrode.

7. The liquid crystal display of claim 6, wherein the common voltage line is transversely arranged to bisect the pixel electrode.

8. The liquid crystal display of claim 4, further comprising an insulating layer formed between the common voltage line and the pixel electrode.

9. The liquid crystal display of claim 8, wherein the pixel electrode and the common voltage line are capacitively coupled to each other via the insulating layer interposed therebetween.

10. The liquid crystal display of claim 9, wherein the insulating layer includes an inorganic layer made of an inorganic insulating material and an organic layer made of an organic insulating material, and wherein the organic layer is not present in a region where the pixel electrode and the common voltage line are capacitively coupled to each other.

11. The liquid crystal display of claim 10, wherein the organic layer includes a color filter.

12. The liquid crystal display of claim 4, wherein the third drain electrode and the fourth drain electrode are connected to each other, and the first subpixel electrode and the fourth drain electrode are capacitively coupled to each other via the insulating layer to form the boosting capacitor.

13. The liquid crystal display of claim 4, further comprising
   an insulating layer formed between the common voltage line and the pixel electrode, wherein
   the insulating layer includes an inorganic layer made of an inorganic insulating material and an organic layer made of an organic insulating material, and
   the organic layer is not present in a region where the pixel electrode and the common voltage line are capacitively coupled to each other.

14. The liquid crystal display of claim 13, wherein the organic layer includes a color filter.

15. The liquid crystal display of claim 4, wherein
an area of the second subpixel electrode is one to three times an area of the first subpixel electrode.

16. The liquid crystal display of claim 4, further comprising
an upper substrate facing the substrate, and
a common electrode formed on the upper substrate.

17. The liquid crystal display of claim 16, wherein
the first and second subpixel electrodes include a first cutout, and the common electrode includes a second cutout.

18. The liquid crystal display of claim 16, wherein:
the first and second subpixel electrodes respectively include a transverse stem, a longitudinal stem crossing the transverse stem, and a plurality of minute branches extending from the transverse stem and the longitudinal stem; and
the first and second subpixel electrodes respectively include a plurality of subregions in which the minute branches extend in different directions.

19. The liquid crystal display of claim 18, wherein
the common voltage line overlaps the longitudinal stems of the first and second subpixel electrodes.

20. A liquid crystal display comprising:
a substrate;
a common voltage line formed on the substrate and transmitting a common voltage;
a pixel electrode formed on the common voltage line and including a first subpixel electrode and a second subpixel electrode;
a first thin film transistor connected to the first subpixel electrode and including a first gate electrode, a first source electrode, and a first drain electrode;
a second thin film transistor connected to the second subpixel electrode and including a second gate electrode, a second source electrode, and a second drain electrode;
a boosting capacitor connected to the first subpixel electrode;
a third thin film transistor connected to the common voltage line and including a third gate electrode, a third source electrode, and a third drain electrode; and
a fourth thin film transistor connected to the second subpixel electrode and the boosting capacitor,
wherein the common voltage line is formed in the same layer as the third source electrode, and is electrically connected to the third source electrode.

* * * * *